Sept. 8, 1970  C. B. RICHEY  3,527,306

SEMIMOUNTED PLOW WITH REAR CASTER WHEEL

Filed July 14, 1967  2 Sheets-Sheet 2

INVENTOR.
CLARENCE B. RICHEY
BY
Tweedale & Gerhardt
ATTORNEYS.

United States Patent Office 3,527,306
Patented Sept. 8, 1970

3,527,306
SEMIMOUNTED PLOW WITH REAR CASTER WHEEL
Clarence B. Richey, Fresno, Calif., assignor to Massey-Ferguson Inc., Detroit, Mich.
Filed July 14, 1967, Ser. No. 653,545
Int. Cl. A01b 3/28, 3/46
U.S. Cl. 172—212     10 Claims

ABSTRACT OF THE DISCLOSURE

A semimounted, two-way, turnover plow in which the trailing end is supported by a caster wheel. In the operative position of the plows, the caster wheel is locked in a steering position to steer the trailing end of the plow to one side of the longitudinal axis of the tractor in accordance with the forces acting on the plow bottoms. Movement of the plow bottoms from their working to transport positions releases the caster wheel and permits it to resume its swiveling action.

BACKGROUND OF THE INVENTION

Field of the invention

The invention relates generally to semimounted plows movable between earthworking and transport positions, and is particularly concerned with semi-mounted, two-way, turnover plows.

Description of the prior art

My copending U.S. applications Ser. No. 524,191, filed Feb. 1, 1966; Ser. No. 632,008, filed Apr. 19, 1967; and Ser. No. 632,009, filed Apr. 19, 1967, the entire disclosures of which are incorporated herein by reference, each disclose semi-mounted plows in which a plow frame is rotatably mounted on an elongated draft frame member, the trailing end of the draft frame member being supported on a steerable ground wheel. The forward end of the craft frame member is supported for side to side swinging movement on the tractor hitch. When the plows are in their working positions, the soil forces on the plow include side forces tending to swing the plow to the left or to the right of the tractor longitudinal axis depending upon whether the left or right-hand plow bottoms are in their earth-working position. The ground wheel is interconnected with the plow frame such that rotation of the plow frame to one or the other of its plowing positions causes the ground wheel to turn in a direction relative to the draft frame member to steer the trailing end of the draft frame member to one side of the longitudinal axis of the tractor in accordance with the action of the soil forces. In the transport position of the plows, the wheel is in line with the tractor longitudinal axis for straight line movement.

SUMMARY OF THE INVENTION

In accordance with the present invention, the trailing end of the draft frame member is supported on a caster wheel. When the plow is actuated to a plowing position such that soil forces tend to move the plow frame to an offset position to one side of the tractor longitudinal axis, a locking member on the plow frame engages a control arm to directionally lock the caster wheel in a position relative to the plow frame to steer the trailing end of the plow frame to the offset position. In the transport position of the plow, the caster wheel is released.

DETAILED DESCRIPTION OF THE PREFERRED EMBODIMENT

Figure 1:
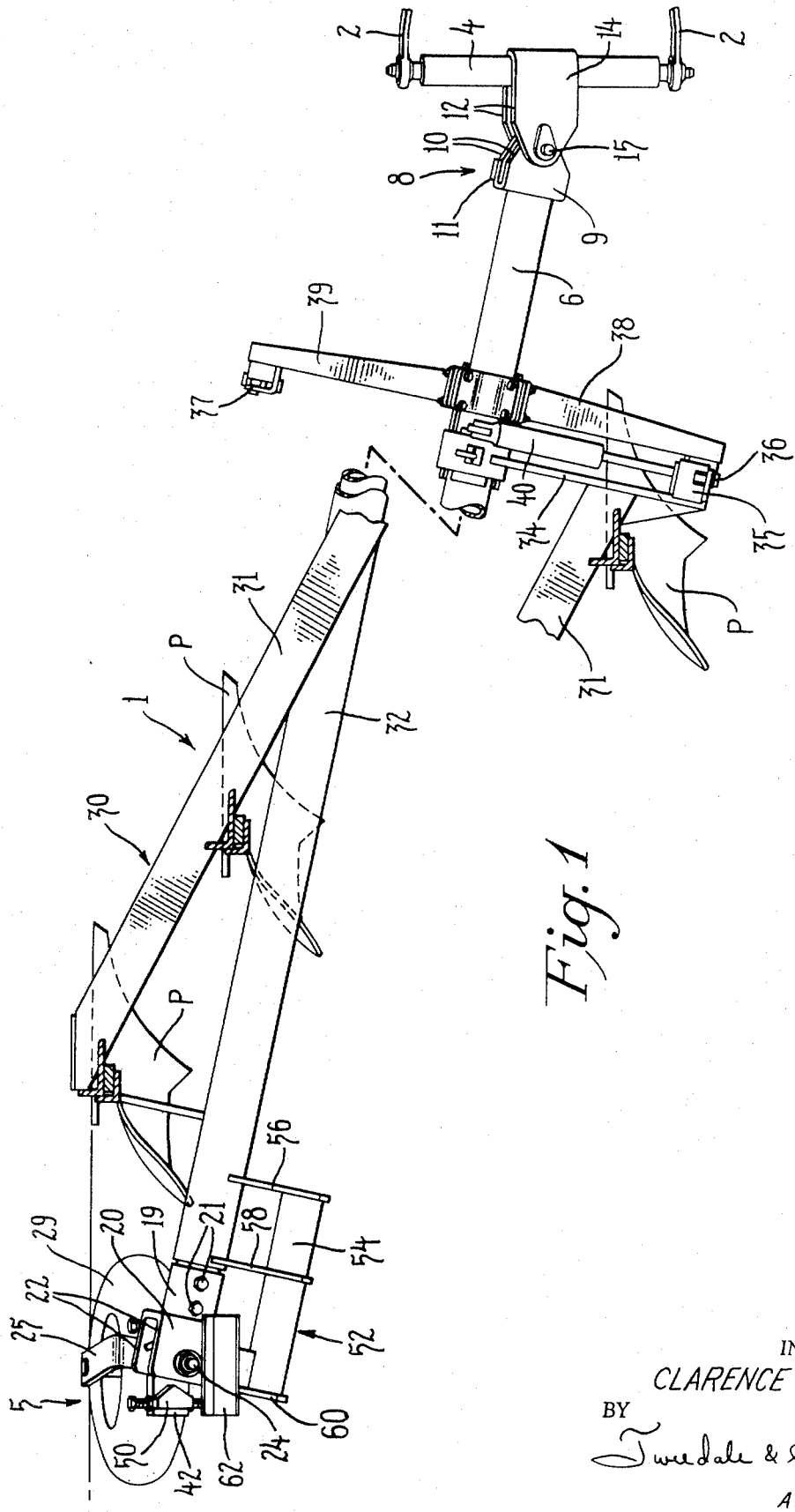
FIG. 1 is a plan view of an implement embodying the invention in its preferred form.

With reference to FIG. 1, the implement is designated collectively by reference numeral 1 and is connected at its forward end with a crossbar 4 mounted between the trailing ends of the lower draft links 2 of a conventional three-point, hydraulic hitch of a tractor (not shown). The rear end of implement 1 is supported on a caster wheel assembly 5. As shown in the drawings, the implement is tilted toward the right (as viewed from the rear) due to the right wheels of the tractor riding in a previously opened furrow and the left wheels riding on unplowed ground.

Implement 1 includes a frame comprising an elongated draft frame member 6, preferably of tubular construction, on which is mounted a forward connecting assembly 8 including a C-shaped bracket 9 having vertically spaced arms 10. Arms 10 of bracket 9 are received between the ends of a pair of vertically spaced arms 12 of a frame member 14 mounted on crossbar 4. Arms 10 and 12 are pivotally connected together by a pin 15 carried by arms 12. A turning stop member 11 is welded or otherwise secured on the side of the lower arm 10 of bracket 9 for engagement with the lower arm 12 of frame 14 to limit the angular relationship between the draft frame and tractor.

Figure 2:
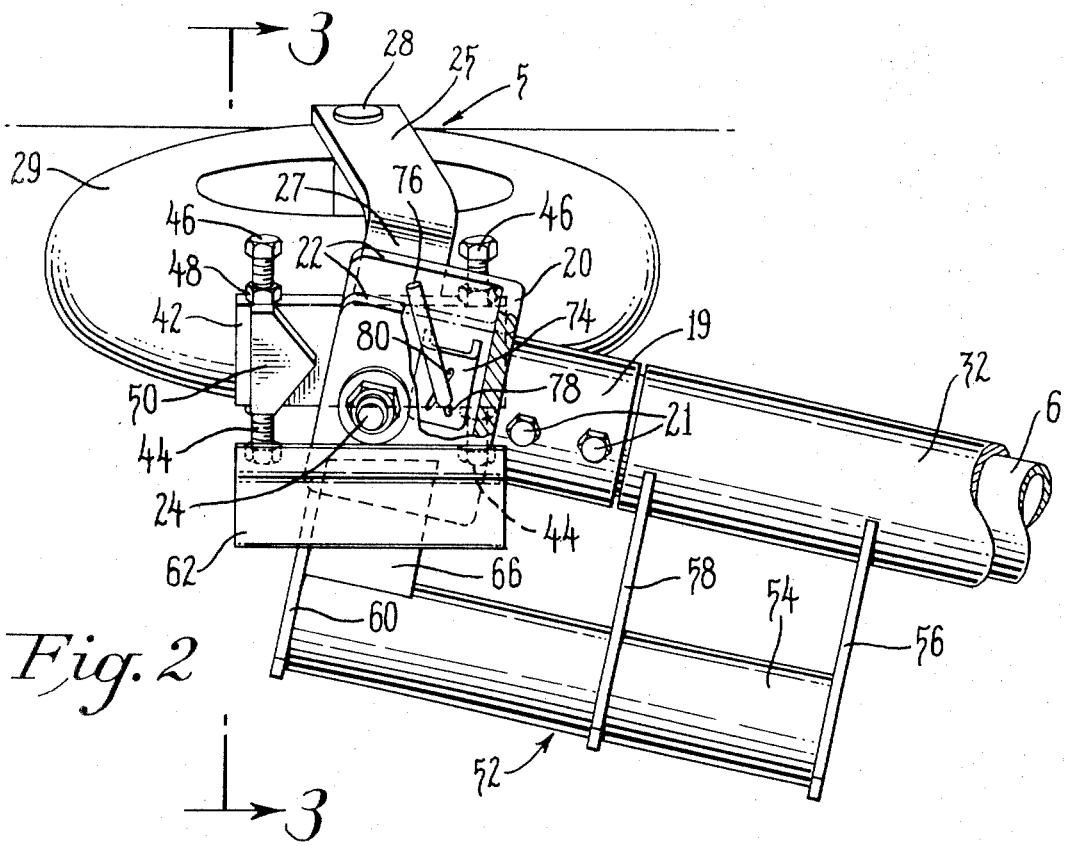
FIG. 2 is an enlarged plan view of the trailing end of the implement of FIG. 1.
Figure 3:
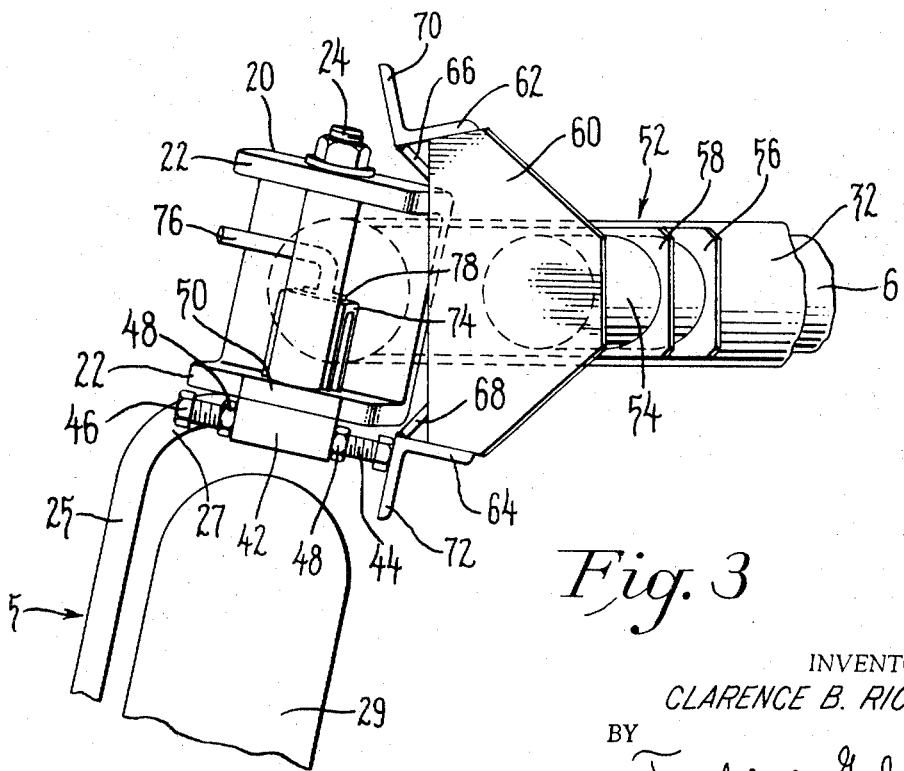
FIG. 3 is a view taken along lines 3—3 of FIG. 2.

With reference primarily to FIGS. 2 and 3, the caster wheel assembly 5 is mounted on a bracket 20 secured to the end of a sleeve 19 non-rotatably fixed to draft frame member 6 by bolts 21. Bracket 20 is formed with vertically spaced, rearwardly projecting arms 22. The shaft 28 of a ground engaging caster wheel 29 is mounted on an arm 25 having an upper horizontal end portion 27 mounted on the frame so as to be rotatable about the axis of a spindle 24. Spindle 24 is mounted between arms 22 of bracket 20. As shown in FIG. 2, arm 25 is bent rearwardly slightly from the end portion 27 to obtain proper castering action.

The plow bottoms P, only the right-hand plow bottoms being visible in the drawings, are supported on a plow frame 30 including a diagonal beam 31 which is secured intermediate its ends to a frame sleeve 32 rotatably mounted on draft frame member 6. The forward end of beam 31 is secured to one end of a transverse frame member 34 which carries a locking member 35. Oppositely projecting arms 38 and 39 carry latching members 36 and 37, respectively, which are alternately engageable by locking member 35. Locking member 35 is actuated by a hydraulic ram 40 which actuates the plow frame to rotate about the axis of draft frame 6 between its alternate left and right-hand plowing positions and transport position in the manner more fully disclosed in my copending application Ser. No. 531,876, filed Mar. 4, 1966 the entire disclosure of which is incorporated herein by reference. Since the turnover mechanism 35, 36, 37, 38, 39, 40, etc. forms no part of the present invention, reference may be had to the latter referred to application for a detailed description of one suitable arrangement.

Again referring to FIGS. 2 and 3, a control arm 42 is mounted on the upper, horizontal end portion 27 of the wheel support arm 25 so as to rotate with the wheel arm 25 about the axis of spindle 24 which may be referred to as the "turning" or "swivel" axis of the caster wheel. As shown in FIG. 2, control arm 42 extends on both sides of the axis of spindle 24. Adjustable abutments in the form of set screws 44 and 46 are mounted on opposite sides of control arm 42 at the ends thereof, and may be locked in position by lock nuts 48.

Mounted on frame sleeve 32 is a bracket 52 including a rearwardly projecting tubular member 54 connected with sleeve 32 by plates 56 and 58. A support plate 60 is mounted on the rear end of tube 54 and cooperates with plates 66 and 68 welded to tube 54 to support a pair of angle sections 62 and 64. Angle sections 62 and 64 have outwardly projecting flanges 70 and 72, respectively, which as indicated in FIG. 3, may be respectively engaged with abutments 44 and 46, respectively. A wedge-shaped stop block 50 is mounted on the upper surface of control arm 42 to limit the castering angle of the wheel so that flanges 70 and 72 can make contact with the adjustable abutments or stops 44, 46 when the plows are rotated to a new operating position and adjust the wheel 29 to a new lead angle.

In the position shown in FIGS. 1, 2 and 3, the right-hand plow bottoms are in their earthworking position and bracket 52 is positioned to the right of draft frame member 6 such that flange 72 of angle section 64 engages stops 44 and prevents wheel 29 from swiveling around the axis of spindle 24. Moreover, flange 72 is disposed such that with the set screws 44 adjusted as shown in FIGS. 2 and 3, wheel 29 is turned at a lead angle relative to draft frame member 6 such that it steers the trailing end of draft member 6 to the left of the tractor longitudinal axis to the position shown in FIG. 1, in which position the plows are urged by the soil forces.

Movement of the plows to their transport position causes rotation of bracket 52 90° in a counterclockwise direction from its FIG. 3 position, and the caster wheel assembly 5 would be free to caster about the axis of spindle 24. Upon further rotation of the frame sleeve 32 to a position 180° counterclockwise from that shown in the drawings to place the left-hand plow bottoms in their earthworking position, the flange 70 on angle section 62 would engage set screws 46 causing wheel 29 to turn in an opposite direction to an angular position relative to draft frame 6 to steer the draft frame to the right-hand side of the tractor longitudinal axis.

A U-shaped bracket 74 is mounted on the lower arm 22 of bracket 20 for receiving a latch pin 76 which, when rotated to the position shown in FIGS. 2 and 3, disengages a pin 78 from a slot 80 and prevents pin 76 from projecting through an opening in flange 22 to engage a corresponding opening in control arm 42. When latch pin 76 is rotated clockwise in FIG. 2 to permit pin 78 engage slot 80, control arm 42 can be locked in line with draft frame member 6 with the plow bottom in transport position for locking and manuevering the tractor-implement combination.

While a specific example of the invention has been disclosed in the foregoing specification and accompanying drawings, it should be understood that the invention is not limited to the exact construction shown by that other forms will be apparent to those skilled in the art.

I claim:

1. A semimounted earthworking implement including a frame comprising an elongated draft frame member having forward connecting means for supporting the forward end of the frame on a draft vehicle for side to side swinging movement; a caster wheel assembly supporting the trailing end of the frame, a control arm on said caster wheel assembly, tool means including a plow frame rotatably mounted on said frame for movement relative to the draft frame between an earthworking position in which the soil forces on the tool means tend to cause the frame to swing about the forward connecting means to a position relative to the draft vehicle offset to one side of the normal trailing position of the frame, and an inoperative transport position out of engagement with the ground and wherein said tool means comprises at least one plow bottom mounted on said plow frame for movement between said earthworking and transport positions upon rotation of said plow frame relative to said draft frame member; locking means operable in response to movement of the tool means to the earthworking position to directionally lock the caster wheel assembly in a position relative to the frame to steer the trailing end of the frame to said offset position, and operable in response to movement of the tool means to the transport position to release the caster wheel and permit the frame to resume its normal trailing position relative to the draft vehicle; and wherein said locking means engages said control arm to directionally lock the caster wheel assembly upon movement of the plow frame to the earthworking position, and wherein said control arm is rotatable about the steering axis of the caster wheel assembly, and the steering axis passes through the control arm intermediate its ends; and wherein said locking means includes a flange engageable with the control arm on either side of the steering axis to directionally lock the caster wheel assembly.

2. A semimounted earthworking implement as claimed in claim 1 further including adjustment means on said caster wheel assembly for selectively adjusting the direction in which the caster wheel assembly is locked by said locking means.

3. A semimounted earthworking implement as claimed in claim 1 wherein said locking means includes a bracket mounted on said plow frame for rotation therewith about said draft frame member; and said flange is mounted on said bracket for movement into and out of the path of rotation of the control arm about the steering axis.

4. A semimounted earthworking implement as claimed in claim 3 further including adjustable abutments on said control arm engageable by said flange for selectively adjusting the locked direction of the caster wheel assembly.

5. A semimounted earthworking implement including: a frame having forward connecting means for supporting the forward end of the frame on a draft vehicle for side to side swinging movement; a caster wheel assembly supporting the trailing end of the frame; a tool means mounted on said frame for movement relative to the frame between an earthworking position in which the soil forces on the tool means tend to cause the frame to swing about the forward connecting means to a position relative to the draft vehicle offset to one side of the normal trailing position of the frame, and an inoperative transport position out of engagement with the ground and locking means operable in response to movement of the tool means to the earthworking position to directionally lock the caster wheel assembly in a position relative to the frame to steer the trailing end of the frame to said offset position, and operable in response to movement of the tool means to the transport position to release the caster wheel and permit the frame to resume its normal trailing position relative to the draft vehicle; and wherein said frame comprises an elongated draft frame member; and further including a supporting frame for said tool means which includes a frame sleeve concentrically mounted on said draft frame member for rotation about the longitudinal axis thereof, and a beam secured intermediate its ends to said frame sleeve with its ends projecting on opposite sides of said frame sleeve; and wherein said tool means comprises a plurality of oppositely projecting left and righthand plow bottoms mounted on said beam along the length thereof for movement upon selective rotation of said frame sleeve with respect to said draft frame member between a right-hand plowing position in which the right-hand plow bottoms only are engageable with the ground, a transport position in which both the right and left-hand plow bottoms project horizontally from said beam, and a left-hand plowing position in which the left-hand plow bottoms only are engageable with the ground.

6. A semimounted earthworking implement as claimed in claim 5 further including a control arm on said caster wheel assembly operatively engageable by said locking means in the right-hand plowing position to lock the caster wheel assembly in a direction to steer the trailing end of the draft frame member to one side of the longitudinal axis of the draft vehicle, and operatively engageable by said locking means in the left-hand plowing position to lock the caster wheel assembly in a direction to steer the trailing end of the draft frame member to the opposite side of the draft vehicle longitudinal axis, said control arm being released by said locking means in the transport position to permit the trailing end of the draft frame member to travel in line with the draft vehicle.

7. A semimounted earthworking implement as claimed in claim 6 wherein said control arm is rotatable about the steering axis of the caster wheel assembly and the steering axis passes through the control arm intermediate its ends; and wherein said locking means includes a right-hand locking flange engageable with one side of the control arm in the right-hand plowing position, and a left-hand locking flange engageable with the other side of the control arm in the left-hand plowing position.

8. A semimounted earthworking implement as claimed in claim 7 wherein said control arm projects on opposite sides of the steering axis; and wherein the locking flanges are inclined in opposite directions relative to the draft frame member so as to turn the control arm with respect to the draft frame member to its alternate position for left and right-hand plowing.

9. A semimounted earthworking implement as claimed in claim 8 further including adjustable abutments mounted on opposite sides of the control arm for engagement by said locking flanges and selectively adjustable relative to the control arm to change the locking direction of the caster wheel assembly.

10. A semimounted earthworking implement as claimed in claim 9 further including transport locking mechanism for selectively locking the caster wheel assembly in alignment with the longitudinal axis of the draft frame member when the plow bottoms are in their transport positions.

References Cited

UNITED STATES PATENTS

| 2,561,032 | 7/1951 | Onfrey | 172—212 |
| 2,732,781 | 1/1956 | Coviello | 172—212 |
| 3,174,556 | 3/1965 | Knapp et al. | 172—212 |

FOREIGN PATENTS 847,664  10/1952  Germany.

ROBERT E. PULFREY, Primary Examiner

W. J. CONLON, Assistant Examiner

U.S. Cl. X.R.

172—204, 291, 285